United States Patent
Seong

[11] Patent Number: 5,949,665
[45] Date of Patent: Sep. 7, 1999

[54] SOFT START PULSE WIDTH MODULATION INTEGRATED CIRCUIT

[75] Inventor: Hwan-Ho Seong, Shiheung, Rep. of Korea

[73] Assignee: Samsung Electronics, Co., Ltd., Suwon, Rep. of Korea

[21] Appl. No.: 08/773,484

[22] Filed: Dec. 23, 1996

[30] Foreign Application Priority Data

Dec. 28, 1995 [KR] Rep. of Korea ............... 95-61333

[51] Int. Cl.$^6$ ............................... H02M 1/12
[52] U.S. Cl. ............................... 363/41; 323/283
[58] Field of Search ............................... 363/41, 49, 97, 363/21; 323/282, 283, 901, 908

[56] References Cited

U.S. PATENT DOCUMENTS

| | | | |
|---|---|---|---|
| 3,693,340 | 9/1972 | Kanai et al. | 363/98 |
| 4,625,271 | 11/1986 | Chetty et al. | 363/49 |
| 5,179,331 | 1/1993 | Sloot | 363/21 |
| 5,537,305 | 7/1996 | Colotti | 363/45 |
| 5,656,890 | 8/1997 | Park | 363/97 |
| 5,675,485 | 10/1997 | Seong | 363/97 |

*Primary Examiner*—Peter S. Wong
*Assistant Examiner*—Derek J. Jardieu
*Attorney, Agent, or Firm*—Marger Johnson McCollom, P.C.

[57] ABSTRACT

A soft start pulse width modulation integrated circuit having a reduced number of external connection terminals, a single one of which transmits the soft start signal superimposed upon an external sync signal. The soft start pulse width modulation integrated circuit includes a comparison voltage signal generating circuit, a soft start and external sync generation circuit, a comparator, a triangle signal generator and a pulse width modulator. The voltage level of a comparison voltage signal is increased over time in response to a feedback signal. A DC voltage signal is generated having a voltage level which increases over time but at a lesser rate than the comparison voltage signal and is superimposed with an external sync signal. The superimposed signal is compared with a reference signal and the resulting compared signal determines a triangular signal generated therefrom which has one of two different oscillation modes: a variable natural mode, and a regulated synchronized mode. The pulse width modulator receives the triangular signals and outputs a pulse-width modulated signal from a single external connection which is dependent upon the oscillation output received from the triangular signal generator.

5 Claims, 2 Drawing Sheets

SOFT START PULSE WIDTH MODULATION INTEGRATED CIRCUIT

BACKGROUND OF THE INVENTION

1. Field of the Invention

The present invention relates to pulse width modulation integrated circuits, and more particularly to a soft start pulse width modulation integrated circuit having a reduced number of external connection terminals whereby the circuit processes a soft start signal and an external sync signal through a single external connection terminal.

2. Description of the Prior Art

A switch-mode power supply (SMPS) is widely used as a power supply for many electronic appliances. A conventional SMPS employs a pulse width modulation integrated circuit and includes a soft start feature for mitigating the transient phenomena that typically occurs when the SMPS is initially operated. The soft start feature slowly increases the current or pulse width supplied by the SMPS according to specified criteria. In a typical pulse width modulation integrated circuit, the soft start function is implemented by employing a capacitor having a large capacitance. The capacitor is coupled to a designated terminal of the SMPS which then acts to limit the rising slope of the current or pulse width supplied to an electronic device. Cathode ray tube (CRT) video appliances such as television sets, monitors, etc. include vertical and horizontal deflection circuits in order to display a video signal on the CRT screen. The horizontal deflection circuit operates with a horizontal scanning frequency of several tens of KHz which is apt to interfere with the switching frequency of the SMPS. This interference causes visual noise to be produced on the screen of the CRT, thereby deteriorating the picture quality.

Generally, the switching operation of the SMPS is synchronized to the horizontal frequency in order to prevent the above described interference phenomena. In a conventional pulse width modulation integrated circuit, the soft start function and the synchronization function are performed with respective signal processes through two separate external connection terminals.

Modern miniaturization techniques have allowed the SMPS and the pulse width modulation circuit to be placed onto a single-packaged integrated circuit. Since the SMPS typically includes a MOSFET power-switching element, however, a heat sink must be integrated with the circuit to dissipate the heat generated from the switching element. This creates severe limitations when accommodating the package with a number of external connection terminals.

Accordingly, the need exists for a soft start and pulse width modulation circuit which operates using as few external connections as possible.

SUMMARY OF THE INVENTION

It is an object of the present invention to solve the problems inherent in the prior art by providing a soft start pulse width modulation integrated circuit which requires fewer external connection terminals than conventional circuits of that type.

In order to achieve the above object, the present invention provides a soft start pulse width modulation integrated circuit comprising a comparison voltage signal generating circuit, a soft start and external sync generation circuit, a comparator, a triangle signal generator and a pulse width modulator. The comparison voltage signal generating circuit generates a comparison voltage signal having a voltage level which increases at a predetermined rate at an initial input of a power supply. The voltage level of this comparison voltage signal varies in response to a feedback signal inputted thereto during normal operation. The soft start and external sync signal input circuit generates a superimposed signal in which a direct current voltage signal is superimposed with an external sync signal having a designated frequency. This direct current voltage signal increases at a rate which is slightly less than that of the comparison voltage signal at the initial input of the power supply. A comparator compares the superimposed signal provided from the soft start and external sync signal input circuit with a reference voltage. A triangular signal generator generates, in response to an output of said comparator, a triangular signal with a first frequency which is lower than the frequency of the sync signal during a soft start operation. Further, the triangular signal generator generates another triangular signal with a frequency of the external sync signal during the normal operation of the soft pulse width modulation integrated circuit. Finally, a pulse width modulator receives the triangular signals and the comparison voltage signal, and generating a pulse-width modulated signal which is proportional to a voltage level of the comparison voltage signal.

The invention further includes a method for transmitting a soft start signal and external sync signal from a power supply source through a single external connection terminal. The method comprises generating a DC voltage signal and increasing the voltage level of the DC voltage signal from an initial start value to a final operative value at a predetermined rate. The DC voltage signal is then superimposed with a synchronization signal having a predetermined oscillatory frequency, and the superimposed signal is compared with a reference signal having a predetermined voltage level. A compared signal is output which has an increasing voltage level dependent upon the DC voltage signal and further has a superimposed synchronization signal of the predetermined oscillatory frequency only if the superimposed signal voltage level is greater than the predetermined voltage level of the reference signal. The method further comprises generating a pulse width modulation signal in response to the compared signal. The pulse width modulation signal has a first variable pulse width that is proportional to the voltage level of the compared signal and a second regulated pulse width determined by the synchronization signal. The pulse width modulation signal of a regulated pulse width is then output when the superimposed signal voltage level is greater than the predetermined voltage level of the reference signal; otherwise, a pulse width modulation signal of a first variable pulse width is output.

BRIEF DESCRIPTION OF THE DRAWINGS

The above object, other features and advantages of the present invention will become more apparent by describing the preferred embodiment thereof with reference to the accompanying drawing, in which.

DETAILED DESCRIPTION OF THE PREFERRED EMBODIMENT

Figure 1:
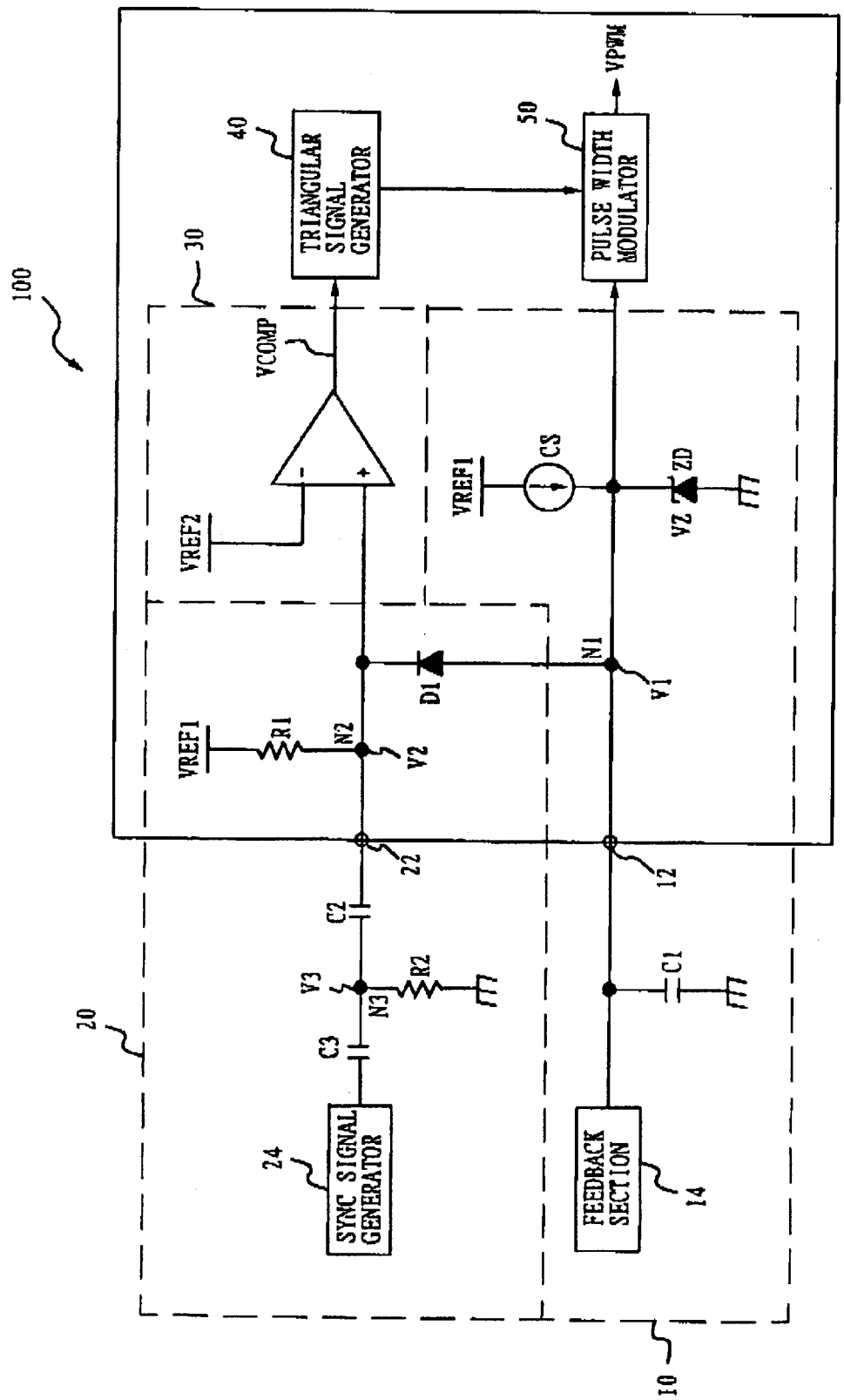
FIG. 1 is a circuit diagram illustrating the construction of the soft start pulse width modulation integrated circuit according to the present invention.

FIG. 1 shows the construction of the soft start pulse width modulation integrated circuit at 100 constructed according to the present invention. Integrated circuit 100 includes a comparison voltage signal generate circuit 10 adapted to generating an increasing comparison voltage signal V1. Circuit 10 increases the voltage signal V1 by a predetermined rate at an initial input of a power supply, and varies it in response to a feedback signal during a normal operation as explained further below. Integrated circuit 100 also includes a soft start and external sync signal input circuit 20 for generating a superimposed signal. Circuit 20 increases a direct current (DC) voltage signal V2 at a rate which is slightly less than that of the comparison voltage signal to create a soft start signal. Soft start signal V2 is superimposed with an external sync signal V3 which is also generated within circuit 20 by means described in further detail below. A comparator circuit 30 compares the level of the superimposed soft start and external sync signal with a second reference voltage VREF2 and outputs the compared signal to a triangular signal generator 40. Generator 40, in response to the output of comparator 30, generates a triangular signal with a first frequency $f_o$. (see FIG. 2E) which is lower than that of the sync signal during a soft start operation; and generates another triangular signal with a frequency of the external sync signal $f_s$, (see FIG. 2E) during the normal operation of the SMPS. Finally, a pulse width modulator 50 is coupled between generator 40 and circuit 10. Modulator 50 receives the triangular signals and the comparison voltage signal V1, and generates a pulse-width modulated signal in response thereto which is proportional to the level of the comparison voltage signal.

The comparison voltage signal generating circuit 10 is provided with a constant current source CS coupled between a first reference voltage VREF1 and a first external connection terminal 12. Circuit 10 includes a Zener diode ZD which is coupled between the first external connection terminal 12 and ground. An external capacitor C1 is coupled to the first external connection terminal 12 where it is charged by a constant current provided from the constant current source CS at the initial input of the power supply. Finally, circuit 10 includes a feedback section 14 for providing the feedback voltage to the first external connection terminal 12.

The soft start and external sync signal input section 20 is provided with a first resistor R1 coupled between the first reference voltage VREF1 and a second external connection terminal 22. A diode D1 is coupled forwardly between the first and the second external connection terminals 12 and 22. A second external capacitor C2 is coupled between the second external connection terminal 22 and a third node N3. A second resistor R2 is coupled between the third node N3 and ground. Finally, circuit 20 includes a sync signal generator 24, coupled to the third node N3 via a coupling capacitor C3, for generating the sync signal.

The method of operation of the preferred embodiment of the invention shown in FIG. 1 is described with reference to the voltage signals shown in FIG. 2. When the power supply is initially operated, the triangular signal generator 40 starts oscillating with its natural frequency, thus causing the pulse width modulator 50 to output a pulse-width modulated signal $f_o$ (shown in FIG. 2E) which is proportional to the voltage level V1 shown generally in FIG. 2A.

The constant current produced from the constant current source CS simultaneously charges the capacitor C1 and the capacitor C2 via diode D1 and resistor R1.

Figure 2A:
FIGS. 2A to 2E are timing diagrams showing the various voltage signals used in the operation of the circuit of FIG. 1.
Figure 2B:
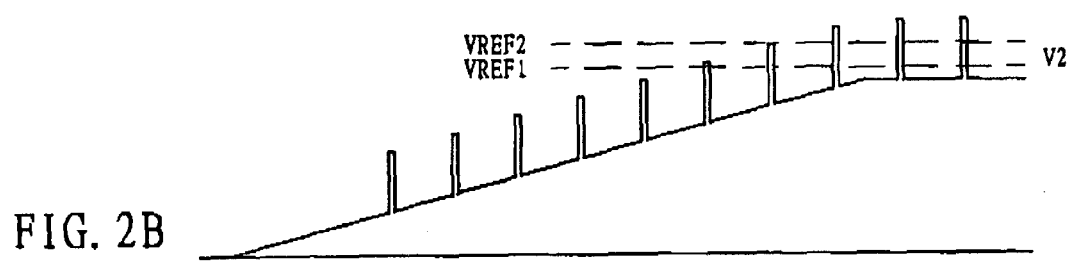
Figure 2C:

At this point, if the terminal voltage Iref×R1 of the resistor R1 is substantially smaller than reference voltage VREF1, voltages V1 and V2 increase gradually as shown in FIG. 2A. Since voltage V1 increases gradually in this situation, the pulse width of the pulse-width modulated signal produced from pulse width modulator 50 also increases gradually as shown in FIG. 2E.

If the capacitance value of capacitor C2 is substantially greater than that of capacitor C1, the rising slope of the voltage V1 becomes almost the same as Iref/C2. Consequently, if the sync signal as shown in FIG. 2C is inputted, only the alternating current (AC) component of sync signal V3 is developed on the terminal of the resistor R1. Since the terminal voltage of capacitor C2 hardly changes, voltage V2 (shown in FIG. 2B) also carries the same alternating current component as voltage V3.

Figure 2D:
Figure 2E:
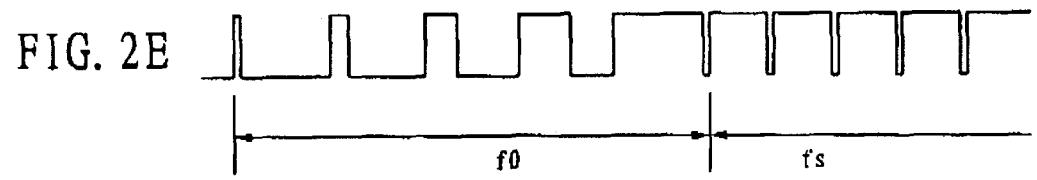

If voltage V2 becomes larger than reference voltage VREF, the sync signal is produced at the output terminal VCOMP of the comparator 30 as shown in FIG. 2D. Thus, the triangular signal generator 40 changes its oscillation frequency to the frequency of the sync signal as shown in FIG. 2E.

At this point, the frequency $f_s$, of the sync signal should be higher than the natural frequency $f_o$ of the triangular signal generator 40. When the voltage V1 becomes equal to the Zener voltage VZ of the Zener diode ZD, it cannot increase any more, but the voltage V2 continuously increases until its mean value becomes the same as the reference voltage VREF1 through resistor R2.

From the foregoing, it will be apparent that the soft start pulse width modulation integrated circuit according to the present invention provides the advantages in that it is capable of reducing the number of external connection terminals needed by performing both the soft start function and the synchronization function through a single external connection terminal VPWM.

While the present invention has been described and illustrated herein with reference to the preferred embodiment thereof, it will be understood by those skilled in the art that various changes in form and details may be made therein without departing from the spirit and scope of the invention.

What is claimed is:

1. A soft start pulse width modulation integrated circuit comprising:

a comparison voltage signal generating circuit for generating a comparison voltage signal having a voltage level which increases at a predetermined rate at an initial input of a power supply, said voltage level varying in response to a feedback signal inputted thereto during a normal operation;

a soft start and external sync signal input circuit for generating a superimposed signal in which a direct current voltage signal is superimposed with an external sync signal having a designated frequency, said direct current voltage signal increasing at a rate which is slightly less than that of said comparison voltage signal at said initial input of said power supply;

a comparator for comparing said superimposed signal provided from said soft start and external sync signal input circuit with a reference voltage;

a triangular signal generator for generating, in response to an output of said comparator, a triangular signal with a first frequency which is lower than the frequency of said sync signal during a soft start operation, and generating another triangular signal with a frequency of said external sync signal during said normal operation; and a pulse width modulator for receiving said triangular signals and said comparison voltage signal, and generating a pulse-width modulated signal which is proportional to a voltage level of said comparison voltage signal.

2. A soft start pulse width modulation integrated circuit as claimed in claim 1, wherein said comparison voltage signal generating means comprises:

a constant current source coupled between a first reference voltage and a first node;

a Zener diode coupled between said first node and ground;

a first external connection terminal coupled to said first node;

an external capacitor, coupled to said first external connection terminal, for being charged by a constant current provided from said constant current source at said initial input of said power supply; and feedback means for providing a feedback voltage to said first external connection terminal.

3. A soft start pulse width modulation integrated circuit as claimed in claim 1, wherein said soft start and external sync signal input means comprises:

a first resistor coupled between a first reference voltage and a second node;

a diode coupled forwardly between a first node and said second node;

a second external connection terminal coupled to said second node;

a second external capacitor coupled between said second external connection terminal and a third node;

a second resistor coupled between said third node and ground; and a sync signal generator, coupled to said third node via a coupling capacitor, for generating said sync signal.

4. A method for transmitting a soft start signal and external sync signal from a power supply source through a single external connection terminal, comprising:

generating a DC voltage signal;

increasing the voltage level of the DC voltage signal from an initial start value to a final operative value at a predetermined rate;

superimposing said DC voltage signal with a synchronization signal having a predetermined oscillatory frequency;

comparing said superimposed signal with a reference signal having a predetermined voltage level and outputting a compared signal having an increasing voltage level dependent upon the DC voltage signal and further having a superimposed synchronization signal of the predetermined oscillatory frequency only if the superimposed signal voltage level is greater than the predetermined voltage level of the reference signal;

generating a pulse width modulation signal in response to said compared signal, said pulse width modulation signal having a first variable pulse width proportional to the voltage level of said compared signal and a second regulated pulse width determined by the synchronization signal; and outputting the pulse width modulation signal of a regulated pulse width when said superimposed signal voltage level is greater than the predetermined voltage level of the reference signal, otherwise outputting the pulse width modulation signal of a first variable pulse width.

5. The method according to claim 4, further including generating a triangular signal in response to said compared signal, said triangular signal having a natural oscillation frequency proportional to the voltage level of said compared signal in the absence of a synchronization signal.

* * * * *